US012745047B2

(12) United States Patent
Ma et al.

(10) Patent No.: US 12,745,047 B2
(45) Date of Patent: Sep. 22, 2026

(54) HEARING DEVICE WITH FOVEATED BEARFORMING AND RELATED METHOD

(71) Applicant: GN Hearing A/S, Ballerup (DK)

(72) Inventors: Changxue Ma, Barrington, IL (US); Rob De Vries, Tilburg (NL); Andrew Dittberner, Andover, MN (US)

(73) Assignee: GN HEARING A/S, Ballerup (DK)

( * ) Notice: Subject to any disclaimer, the term of this patent is extended or adjusted under 35 U.S.C. 154(b) by 268 days.

(21) Appl. No.: 18/395,199

(22) Filed: Dec. 22, 2023

(65) Prior Publication Data

US 2025/0211922 A1 Jun. 26, 2025

(51) Int. Cl.
*H04R 25/00* (2006.01)

(52) U.S. Cl.
CPC ......... *H04R 25/407* (2013.01); *H04R 25/505* (2013.01); *H04R 25/552* (2013.01); *H04R 2225/021* (2013.01); *H04R 2225/43* (2013.01)

(58) Field of Classification Search
CPC .. H04R 25/407; H04R 25/505; H04R 25/552; H04R 2225/021; H04R 2225/43; H04R 3/005; H04R 1/1083; H04R 25/50
See application file for complete search history.

(56) References Cited

U.S. PATENT DOCUMENTS

2012/0114128 A1 5/2012 Derkx
2022/0124440 A1* 4/2022 Koutrouli ............ H04R 25/407
2023/0071778 A1 3/2023 Du et al.

OTHER PUBLICATIONS

Extended European Search Report for EP Patent Appln. No. 24220343.8 dated May 22, 2025.

* cited by examiner

*Primary Examiner* — Tuan D Nguyen
(74) *Attorney, Agent, or Firm* — Vista IP Law Group, LLP

(57) ABSTRACT

A hearing device for a binaural hearing system and related methods are disclosed, the hearing device comprising a set of microphones comprising a first BTE microphone for provision of a first BTE microphone input signal, and a second BTE microphone for provision of a second BTE microphone input signal; a first beamformer connected to the first BTE microphone and the second BTE microphone for provision of a directional input signal based on the first BTE microphone input signal and the second BTE microphone input signal; a processor configured to provide an electrical output signal based on the directional input signal; and a receiver for converting the electrical output signal to an audio output signal, wherein the first beamformer is a foveated beamformer.

20 Claims, 5 Drawing Sheets

HEARING DEVICE WITH FOVEATED BEARFORMING AND RELATED METHOD

FIELD

The present disclosure relates to a hearing device for a binaural hearing system and related methods including a method for designing a beamformer of a hearing device.

BACKGROUND

People with a hearing loss often experience difficulties understanding speech in noisy environments. Listening devices, including hearing devices with compensation for a hearing loss, use beamforming to help people with hearing loss hear better in noisy environments. Beamforming focuses the sound coming from a certain direction and reduce the noise from other directions. However, beamforming also affects how well the hearing aids can capture the spatial cues which assist the user in locating where sounds are coming from. For example, the hypercardioid pattern is a type of beamforming that has a very narrow focus with spatial cues being lost.

Challenges still remain in recovering and maintaining binaural cues of sound sources while providing a sufficient directional focus.

SUMMARY

Accordingly, there is a need for hearing devices and methods with improved spatial cueing of sound sources and/or improved beamforming.

Disclosed is a hearing device, e.g. for a binaural hearing system, the hearing device comprising a set of microphones comprising a first BTE microphone for provision of a first BTE microphone input signal, and/or a second BTE microphone for provision of a second BTE microphone input signal; a first beamformer connected to the first BTE microphone and/or the second BTE microphone for provision of a directional input signal based on the first BTE microphone input signal and/or the second BTE microphone input signal; a processor configured to provide an electrical output signal based on the directional input signal; and a receiver for converting the electrical output signal to an audio output signal, wherein the first beamformer may be a foveated beamformer.

A method of designing a beamformer, such as the first beamformer, of a hearing device is disclosed, the method comprising obtaining a first BTE microphone input signal, e.g. from a first BTE microphone; obtaining a second BTE microphone input signal, e.g. from a second BTW microphone; determining first beamformer coefficients of a first beamformer based on a cost function; and applying the first beamformer coefficients to the first beamformer of the hearing device. Determining first beamformer coefficients of a first beamformer based on a cost function comprises determining first beamformer coefficients of a first beamformer based on a cost function comprising an omnidirectional component and/or a first cost component, e.g. associated with a first angular range and/or a first frequency range.

Also, a binaural hearing system is disclosed, the binaural hearing system comprising a first hearing device and a second hearing device, wherein the first hearing device is a hearing device as disclosed herein and the second hearing device is a hearing device as disclosed herein.

The present disclosure allows for improved spatial discrimination of sound sources associated with different spatial locations while providing sufficient focusing of incoming sound. Improved speech intelligibility in noisy environments is provided.

The present disclosure allows reducing undesired sound sources while preserving binaural cues of sound sources to preserve the user's spatial impression of an acoustic environment.

The present disclosure advantageously makes use of synergistical visual and auditory integration and/or. The auditory spatial cues in the field of view region are improved and the out of view noisy sources are suppressed.

The foveated beamforming of the present disclosure processes audio signals with different levels of detail depending on the location of the sources and enhances the sound quality and spatial perception by providing better spatial cues for sources in the first angular range, such as the field of view region, and suppressing noise from sources in the second angular range, e.g. out of view.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
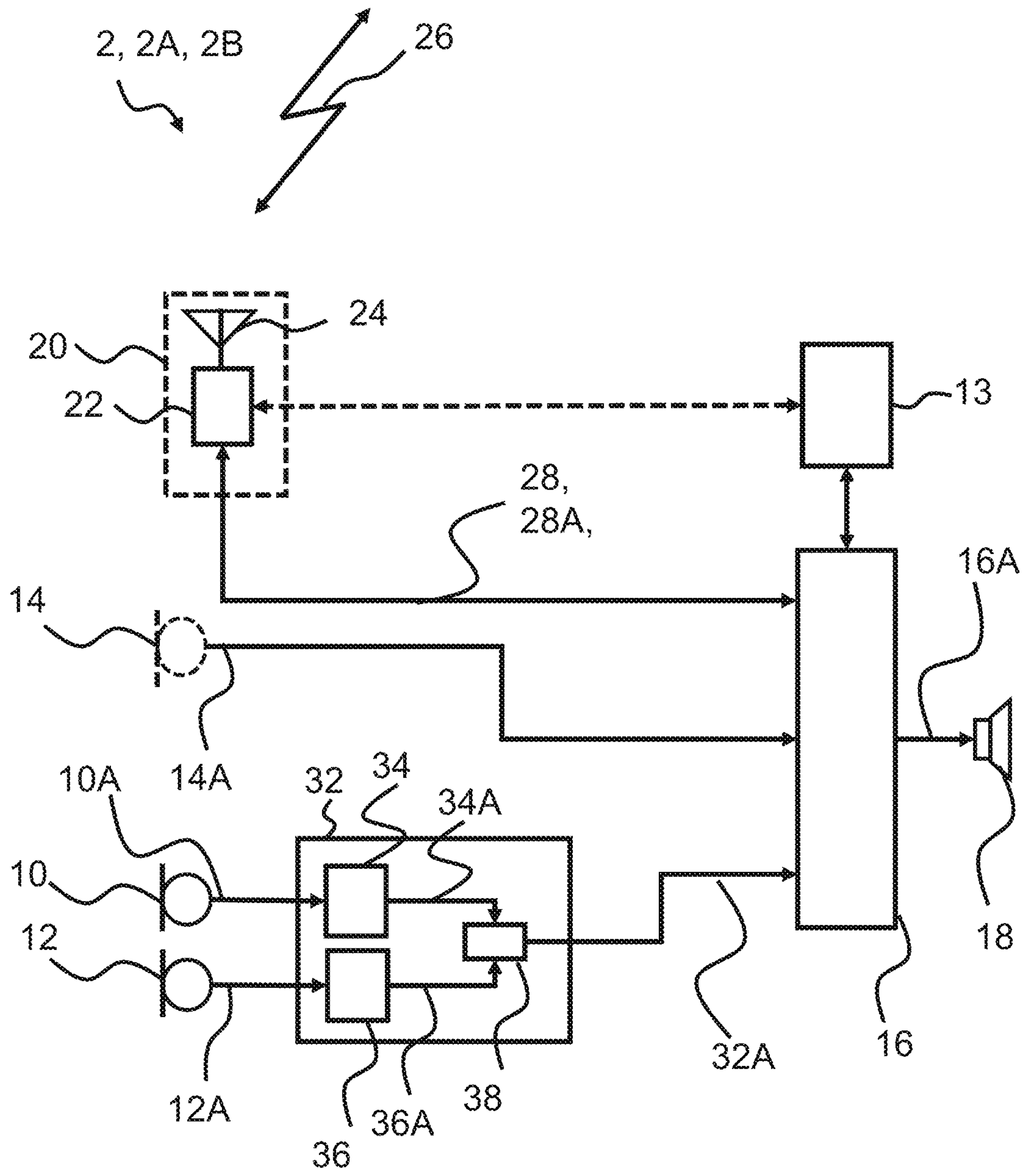
FIG. 1 schematically illustrates an example hearing device according to this disclosure, FIG. 2 schematically illustrates a binaural hearing system according to the present disclosure.

Various exemplary embodiments and details are described hereinafter, with reference to the figures when relevant. It should be noted that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device also denoted first hearing device and/or second hearing device is disclosed, e.g. a hearing device for a binaural hearing system. The hearing device may be configured to be worn at an ear of a user and may be a hearable or a hearing aid, wherein the processor is configured to compensate for a hearing loss of a user.

The hearing device may be of the behind-the-ear (BTE) type, in-the-ear (ITE) type, in-the-canal (ITC) type, receiver-in-canal (RIC) type, receiver-in-the-ear (RITE) type, or microphone-in-ear (MIE) type. The hearing aid may be a binaural hearing aid. The hearing device may comprise a first earpiece and a second earpiece, wherein the first earpiece and/or the second earpiece is an earpiece as disclosed herein.

The hearing device may be configured for wireless communication with one or more devices, such as with another hearing device, e.g. as part of a binaural hearing system, and/or with one or more accessory devices, such as a smartphone and/or a smart watch.

The hearing device may comprise a transceiver module for communication with a contralateral hearing device of the binaural hearing system and/or one or more accessory devices. The transceiver module is optionally configured to receive contralateral data from the contralateral hearing device, the contralateral data optionally comprising a contralateral directional input signal.

Thus, the hearing device/transceiver module optionally comprises an antenna for converting one or more wireless input signals, e.g. a first wireless input signal and/or a second wireless input signal, to antenna output signal(s). The wireless input signal(s) may origin from external source(s), such as spouse microphone device(s), wireless TV audio transmitter, and/or a distributed microphone array associated with a wireless transmitter. The wireless input signal(s) may origin from another hearing device, e.g. as part of a binaural hearing system, and/or from one or more accessory devices.

The hearing device/transceiver module optionally comprises a radio transceiver coupled to the antenna for converting the antenna output signal to a transceiver input signal. Wireless signals from different external sources may be multiplexed in the radio transceiver to a transceiver input signal or provided as separate transceiver input signals on separate transceiver output terminals of the radio transceiver. The hearing device may comprise a plurality of antennas and/or an antenna may be configured to be operate in one or a plurality of antenna modes. The transceiver input signal optionally comprises a first transceiver input signal representative of the first wireless signal from a first external source.

The hearing device comprises a set of microphones. The set of microphones may comprise one or more microphones. The set of microphones comprises a first microphone, e.g. a first BTE microphone, for provision of a first microphone input signal, e.g. a first BTE microphone input signal. The first BTE (Behind-The-Ear) microphone is arranged in a housing configured to be arranged behind the ear of a user. The set of microphones comprises a second microphone, e.g. a second BTE microphone, for provision of a second microphone input signal, e.g. a second BTE microphone input signal. The second BTE (Behind-The-Ear) microphone is optionally arranged in a housing configured to be arranged behind the ear of a user. The set of microphones optionally comprises a third microphone, e.g. a first MIE microphone, for provision of a third microphone input signal, e.g. a first MIE microphone input signal. The first MIE (Microphone-In-Ear) microphone is arranged near, at or in the ear canal of the user, e.g. in an earpiece connected by wire to a BTE housing. The set of microphones may comprise N microphones for provision of N microphone signals, wherein N is an integer in the range from 1 to 10. In one or more example hearing devices, the number N of microphones is two, three, four, five or more.

The hearing device comprises a first beamformer connected to the first BTE microphone and the second BTE microphone for provision of a directional input signal based on the first BTE microphone input signal and/or the second BTE microphone input signal. The first beamformer may be a fixed beamformer. The first beamformer may be a foveated beamformer. The first beamformer may comprise a first filter for filtering the first BTE microphone input for provision of a first filter output, the first beamformer optionally comprising a second filter for filtering the second BTE microphone input signal for provision of a second filter output. The first filter output and the second filter output are optionally added in adder for provision of the directional input signal.

The design of the first beamformer is an optimization process to obtain two filters under certain constraints. In the present disclosure, new constrains or cost components are added to reduce the mismatch between two polar patterns e.g. in the field of view (−30,30) or in peripheral view (−60,60).

In the present context, a foveated beamformer is a beamformer that is designed to maintain the spatial cues in a first angular range and to suppress noise in a second angular range and/or in a third angular range.

The hearing device comprises a processor configured to provide an electrical output signal based on the directional input signal. In other words, the processor may be configured to process input signals, such as the directional input signal, for provision of the electrical input signal. The processor is optionally configured to compensate for hearing loss of a user of the hearing device.

The hearing device comprises a receiver for converting the electrical output signal to an audio output signal.

The present disclosure provides improved auditory focus in the field of view while maintaining spatial cues.

It is noted that descriptions and features of hearing device functionality, such as hearing device configured to, also apply to methods and vice versa. For example, a description of a hearing device configured to determine also applies to a method, e.g. of operating a hearing device, wherein the method comprises determining and vice versa.

In one or more examples, a hearing device for a binaural hearing system is disclosed, the hearing device comprising a set of microphones comprising a first BTE microphone for provision of a first BTE microphone input signal, and a second BTE microphone for provision of a second BTE microphone input signal; a first beamformer connected to the first BTE microphone and the second BTE microphone for provision of a directional input signal based on the first BTE microphone input signal and the second BTE microphone input signal; a processor configured to provide an electrical output signal based on the directional input signal; and a receiver for converting the electrical output signal to an audio output signal, wherein the first beamformer optionally is a foveated beamformer.

In one or more examples, the first beamformer is configured to process the first BTE microphone input signal and the second BTE microphone input signal with a first level of accuracy with regard to spatial cue maintenance in a first angular range and a second level of accuracy with regard to spatial cue maintenance in a second angular range.

The first angular range may be a field of view angular range. The first angular range may be from a first left angle (first left direction forming first left angle to zero direction) to a first right angle (first right direction forming first right angle to zero direction). The first left angle also denoted VL_1 or $-\vartheta$ may be in the range from −60 degrees to −15 degrees, such as −30 or −45 degrees. The first right angle also denoted VR_1 or $\vartheta$ may be in the range from 15 degrees to 60 degrees, such as 30 or 45 degrees. It is to be noted that angles are indicated relative to the zero direction (0 degrees) also denoted look direction or front direction. In one or more examples, the first left angle is −30 degrees and the first right angle is 30 degrees, which corresponds to the human binocular view. In other words, the first angular range may be or correspond to the human binocular field of view.

The second angular range may be or include a peripheral angular range. The second angular range may comprise a second left angular range. The second angular range may be from a second left angle (second left direction forming second left angle to zero direction) to the first left angle or from the first right angle to a second right angle (second right direction forming second right angle to zero direction). The second angular range may be at least a part of from the first right angle to the first left direction. The second angular range may be seen as a part of an omnidirectional angular range that is not overlapping with the first angular range.

The second left angle also denoted VL_2 may be in the range from −180 degrees to −15 degrees, such as −30, −45, or −60 degrees. The second right angle also denoted VR_2 may be in the range from 15 degrees to 95 degrees, such as 30, 45, or 60 degrees.

In one or more examples, the first level of accuracy with regard to spatial cue maintenance is higher than the second level of accuracy with regard to spatial cue maintenance.

In one or more examples, the first angular range includes a left focus range and/or a right focus range. The left focus range may be from the first left angle to the zero direction. The right focus range may be from the zero direction to the first right angle.

In one or more examples, the second angular range includes a left peripheral range and/or a right peripheral range. The left peripheral range may be from the second left angle to the first left angle. The right peripheral range may be from the first right angle to the second right angle.

In one or more examples, the second angular range, for a left hearing device, is from −180 to the first left angle, e.g. −60, −45, or −30 degrees.

In one or more examples, the second angular range, for a right hearing device, is from the first right angle, e.g. 30, 45, or 60 degrees, to 180 degrees.

A beamforming pattern $P^l$ for a hearing device configured as a left hearing device may be given as:

$$P^l(f, \theta) = F_{fl}(f, b) * H_{fl}(f, \theta) + F_{bl}(f, a) * H_{bl}(f, \theta),$$

where a and b are FIR filter coefficients of the first beamformer; $H_{fl}$ is transfer function, such as HRTF, of first BTE microphone (front left microphone), $H_{bl}$ is transfer function, such as HRTF, of second BTE microphone (behind left microphone), $F_{fr}$ is first filter of the first beamformer, and $F_{br}$ is second filter of the first beamformer.

A beamforming pattern $P^r$ for a hearing device configured as a right hearing device may be given as:

$$P^r(f, \theta) = F_{fr}(f, d) * H_{fr}(f, \theta) + F_{br}(f, c) * H_{br}(f, \theta),$$

where c and d are FIR filter coefficients of the first beamformer; $H_{fr}$ is transfer function, such as HRTF, of first BTE microphone (front right microphone), $H_{br}$ is transfer function, such as HRTF, of second BTE microphone (behind right microphone), $F_{fr}$ is first filter of the first beamformer, and $F_{br}$ is second filter of the first beamformer.

In one or more examples, first beamformer coefficients, such as first filter coefficients and/or second filter coefficients, of the first beamformer are based on a cost function, e.g. by minimizing the cost function. The cost function may comprise a plurality of cost components, e.g. a sum of cost components.

The cost function optionally comprises an omnidirectional component. The omnidirectional component may be based on a beamforming target function and a beamforming pattern of the hearing device/first beamformer. The beamforming target function also denoted BF is denoted $BF^l$ for a hearing device configured as a left hearing device and $BF^r$ for a hearing device configured as a right hearing device. The beamforming pattern also denoted P for the hearing device/first beamformer is denoted $P^l$ for a hearing device configured as a left hearing device and $P^r$ for a hearing device configured as a right hearing device.

The omnidirectional component for a cost function of a left hearing device is also denoted OC_L and may be given as:

$$OC\_L = \int\int_{-180}^{180} (BF^l(f, \theta) - |P^l(f, \theta)|)^2 df d\theta,$$

where $BF^l$ is left beamforming target function and $P^l$ is left beamforming pattern.

The omnidirectional component for a cost function of a right hearing device is also denoted OC_R and may be given as:

$$OC\_R = \int\int_{-180}^{180} (BF^r(f, \theta) - |P^r(f, \theta)|)^2 df d\theta,$$

where $BF^r$ is right beamforming target function and $P^r$ is right beamforming pattern.

The omnidirectional component may be associated with, e.g. determined or calculated for, an omnidirectional angular range, such as from −180 degrees to 180 degrees, and/or an omnidirectional frequency range, such as from 200 Hz to 3.5 kHz.

The omnidirectional component for a cost function of a left hearing device is also denoted OC_L and may be given as:

$$OC\_L = \int_{fl}^{fh}\int_{-180}^{180} (BF^l(f, \theta) - |P^l(f, \theta)|)^2 df d\theta,$$

where fl is the omnidirectional low frequency, such as 200 Hz, and fh is the omnidirectional high frequency, such as 3.5 kHz, of omnidirectional frequency range, [−180,180] is the omnidirectional angular range, where $BF^l$ is left beamforming target function and $P^l$ is left beamforming pattern.

In one or more examples, first beamformer coefficients of the first beamformer are based on a cost function comprising a first cost component associated with the first angular range, such as from −30 degrees to 30 degrees, from −45 degrees to 45 degrees, or from −60 degrees to 60 degrees, and/or a first frequency range, such as from a first low frequency to a first high frequency. The first low frequency also denoted fl1 may be less than 1 kHz, such as in the range from 100 Hz to 500 Hz, and/or the first high frequency also denoted fh1 may be larger than 2 kHz, such as in the range from 3 kHz to 8 kHz, e.g. 3.5 kHz.

In other words, the cost function optionally comprises a first cost component. The first cost component may be based on the beamforming pattern P and optionally a polar pattern of the first MIE microphone. The first cost component may be based on a reqularizing parameter or weight, e.g. in the range from 1 to 100.

The first cost component may be based on the beamforming pattern P and an open ear response also denoted OER, e.g. when no first MIE microphone is available in the hearing device.

The first cost component also denoted CC_1 is denoted CC_L_1 for a hearing device configured as a left hearing device and CC_R_1 for hearing device configured as a right hearing device.

The first cost component CC_L_1 for a cost function of a left hearing device may be given as:

$$CC\_L\_1 = R_a \int_{fl1}^{fh1} \int_{-\theta}^{+\theta} \left(MIE^l(f, \theta) - \left|P^l(f, \theta)\right|\right)^2 df d\theta,$$

where fl1 is the first low frequency, such as 200 Hz, and fh1 is the first high frequency, such as 3.5 kHz, of first frequency range, [−ϑ,ϑ] is the first angular range, such as from −30 degrees to 30 degrees, from −45 degrees to 45 degrees, or from −60 degrees to 60 degrees, $MIE^l$ is polar pattern of first MIE microphone, $P^l$ is beamforming pattern of first beamformer, and $R_a$ is a regularizing parameter.

The first cost component CC_L_1 for a cost function of a left hearing device may be given as:

$$CC\_L\_1 = R_a \int_{fp}^{fh} \int_{-\theta}^{+\theta} \left(OER^l(f, \theta) - \left|P^l(f, \theta)\right|\right)^2 df d\theta,$$

where fl1 is the first low frequency, such as 200 Hz, and fh1 is the first high frequency, such as 3.5 kHz, of first frequency range, [−ϑ,ϑ] is the first angular range, such as from −30 degrees to 30 degrees, from −45 degrees to 45 degrees, or from −60 degrees to 60 degrees, $OER^l$ is polar pattern of open ear response, $P^l$ is beamforming pattern of first beamformer, and $R_a$ is a regularizing parameter.

The first cost component CC_R_1 for a cost function of a right hearing device may be given as:

$$CC\_R\_1 = R_a \int_{fl1}^{fh1} \int_{-\theta}^{+\theta} (MIE^r(f, \theta) - |P^r(f, \theta)|)^2 df d\theta,$$

where fl1 is the first low frequency, such as 200 Hz, and fh1 is the first high frequency, such as 3.5 kHz, of first frequency range, [−ϑ,ϑ] is the first angular range, such as from −30 degrees to 30 degrees, from −45 degrees to 45 degrees, or from −60 degrees to 60 degrees, $MIE^r$ is polar pattern of first MIE microphone, $P^r$ is beamforming pattern of first beamformer, and $R_a$ is a regularizing parameter.

The first cost component CC_R_1 for a cost function of a right hearing device may be given as:

$$CC\_R\_1 = R_a \int_{fl1}^{fh1} \int_{-\theta}^{+\theta} (OER^r(f, \theta) - |P^r(f, \theta)|)^2 df d\theta,$$

where fl1 is the first low frequency, such as 200 Hz, and fh1 is the first high frequency, such as 3.5 kHz, of first frequency range, [−ϑ,ϑ] is the first angular range, such as from −30 degrees to 30 degrees, from −45 degrees to 45 degrees, or from −60 degrees to 60 degrees, $OER^r$ is polar pattern of open ear response, $P^r$ is beamforming pattern of first beamformer, and $R_a$ is a regularizing parameter.

In one or more examples, the cost function comprises a second cost component associated with the second angular range and/or a second frequency range, wherein the first beamformer coefficients are based on the second cost component. The second cost component may be based on (left/right) beamforming target function and/or (left/right) beamforming pattern.

The second frequency range for a second cost component may be different from the first frequency range for the first cost component. This may allow for improved noise reduction and spatial cue maintenance.

The second angular range for a second cost component in a cost function of a left hearing device may be from −180 degrees to −60 degrees, −45 degrees, or −30 degrees.

The second cost component CC_L_2 for a cost function of a left hearing device may be given as:

$$CC\_L\_2 = \int_{fl2}^{fh2} \int_{-180}^{-\vartheta} \left(BF^l(f, \theta) - \left|P^l(f, \theta)\right|\right)^2 df d\theta,$$

where fl2 is the second low frequency, such as 200 Hz, and fh2 is the second high frequency, such as 3.5 kHz, of second frequency range, [−180,−ϑ] is the second angular range, where D may be in the range from 15 degrees to 90 degrees, such as 30 degrees, degrees, or 60 degrees, where $BF^l$ is left beamforming target function and $P^l$ is left beamforming pattern.

The second angular range for a second cost component in a cost function of a right hearing device may be from 30 degrees, 45 degrees, or 60 degrees to 180 degrees.

The second cost component CC_R_2 for a cost function of a right hearing device may be given as:

$$CC\_R\_2 = \int_{fl2}^{fh2} \int_{\vartheta}^{180} (BF^r(f, \theta) - |P^r(f, \theta)|)^2 df d\theta,$$

where fl2 is the second low frequency, such as 200 Hz, and fh2 is the second high frequency, such as 3.5 kHz, of second frequency range, [ϑ,180] is the second angular range, where D may be in the range from 15 degrees to 90 degrees, such as 30 degrees, degrees, or 60 degrees, where $BF^l$ is left beamforming target function and $P^l$ is left beamforming pattern.

The second frequency range for a second cost component in a cost function may be from a second low frequency to a second high frequency. The second low frequency may be less than 1 kHz, such as in the range from 100 Hz to 500 Hz, and/or the second high frequency may be larger than 2 kHz, such as in the range from 3 kHz to 8 kHz, e.g. 3.5 kHz.

In one or more examples, the cost function comprises the omnidirectional component and the first cost component.

In one or more examples, the cost function comprises the first cost component and the second cost component.

In one or more examples, the cost function comprises a third cost component associated with a third angular range and/or a third frequency range, wherein the first beamformer coefficients are based on the third cost component. The third cost component may be based on (left/right) beamforming target function and/or (left/right) beamforming pattern. In one or more examples, the cost function comprises the first cost component, the second cost component, and the third cost component.

The third angular range for a third cost component in a cost function of a left hearing device or a right hearing device may be from 30 degrees, 45 degrees, or 60 degrees to 180 degrees.

The third cost component CC_L_3 for a cost function of a left hearing device may be given as:

$$CC\_L\_3 = \int_{fl3}^{fh3} \int_{\vartheta}^{180} \left(BF^{l}(f,\theta) - \left|P^{l}(f,\theta)\right|\right)^{2} df d\theta,$$

where fl3 is the third low frequency, such as 200 Hz, and fh3 is the third high frequency, such as 3.5 kHz, of third frequency range, [4,180] is the third angular range, where $\vartheta$ may be in the range from 15 degrees to 90 degrees, such as 30 degrees, 45 degrees, or 60 degrees, where $BF^{l}$ is left beamforming target function and $P^{l}$ is left beamforming pattern.

The third angular range for a third cost component in a cost function of a right hearing device may be from −180 to −30 degrees, −45 degrees, or −60 degrees.

The third cost component CC_R_3 for a cost function of a right hearing device may be given as:

$$CC\_R\_3 = \int_{fl3}^{fh3} \int_{-180}^{-\vartheta} \left(BF^{r}(f,\theta) - \left|P^{r}(f,\theta)\right|\right)^{2} df d\theta,$$

where fl3 is the third low frequency, such as 200 Hz, and fh3 is the third high frequency, such as 3.5 kHz, of third frequency range, $[-180,-\vartheta]$ is the third angular range, where $\vartheta$ may be in the range from 15 degrees to 90 degrees, such as 30 degrees, 45 degrees, or 60 degrees, where $BF^{l}$ is right beamforming target function and $P^{r}$ is right beamforming pattern.

In one or more examples, the hearing device comprises a first MIE microphone for provision of a first MIE microphone input signal, wherein the cost function COST (e.g. for a left hearing device) is given by $$COST = CC\_L\_1 + CC\_L\_2 + CC\_L\_3 = R_a\left(\int_{fl1}^{fh1}\int_{-\vartheta}^{+\vartheta}\left(MIE^{l}(f,\theta) - \left|P^{l}(f,\theta)\right|\right)^{2} df d\theta + \int_{fl2}^{fh2}\int_{-180}^{-\vartheta}\left(BF^{l}(f,\theta) - \left|P^{l}(f,\theta)\right|\right)^{2} df d\theta + \int_{fl3}^{fh3}\int_{\vartheta}^{180}\left(BF^{l}(f,\theta) - \left|P^{l}(f,\theta)\right|\right)^{2} df d\theta,\right.$$

where $P^{l}$ is beamforming pattern of the first beamformer, $BF^{l}$ is beamforming target function, $MIE^{l}$ is polar pattern of the first MIE microphone, $[-\vartheta,\vartheta]$ are angle limits of first angular range, fh1, fh2, fh3, fl1, fl2, and fl3 are frequency limits of respective frequency ranges, and $R_a$ is a regularizing parameter.

In one or more examples, the hearing device comprises a first MIE microphone for provision of a first MIE microphone input signal, wherein the cost function COST (e.g. for a right hearing device) is given by $$COST = CC\_R\_1 + CC\_R\_2 + CC\_R\_3 = R_a\left(\int_{fl1}^{fh1}\int_{-\vartheta}^{+\vartheta}\left(MIE^{l}(f,\theta) - \left|P^{l}(f,\theta)\right|\right)^{2} df d\theta + \int_{fl2}^{fh2}\int_{\vartheta}^{180}\left(BF^{r}(f,\theta) - \left|P^{r}(f,\theta)\right|\right)^{2} df d\theta + \int_{fl3}^{fh3}\int_{-180}^{-\vartheta}\left(BF^{r}(f,\theta) - \left|P^{r}(f,\theta)\right|\right)^{2} df d\theta + \int_{fl2}^{fh2}\int_{\vartheta}^{180}\left(BF^{r}(f,\theta) - \left|P^{r}(f,\theta)\right|\right)^{2} df d\theta + \int_{fl3}^{fh3}\int_{-180}^{-\vartheta}\left(BF^{r}(f,\theta) - \left|P^{r}(f,\theta)\right|\right)^{2} df d\theta,\right.$$

where $P^{r}$ is beamforming pattern of the first beamformer, $BF^{r}$ is beamforming target function, $MIE^{r}$ is polar pattern of the first MIE microphone, $[-\vartheta,\vartheta]$ are angle limits of first angular range, fh1, fh2, fh3, fl1, fl2, and fl3 are frequency limits of respective frequency ranges, and $R_a$ is a regularizing parameter.

In one or more examples, the first beamformer coefficients of the first beamformer are matched to a polar pattern of the first MIE microphone or an open ear response.

For example, one of left BFs, e.g. in second cost component or the third cost component, may be given by $$BF^{l}(f,\theta) = \begin{cases} MIE^{l}(f,\theta) & \text{when } \theta = 0 \\ 0 & \text{when } \theta \neq 0 \end{cases}$$

For example, one of right BFs may, e.g. in second cost component or the third cost component, be given by $$BF^{r}(f,\theta) = \begin{cases} MIE^{e}(f,\theta) & \text{when } \theta = 0 \\ 0 & \text{when } \theta \neq 0 \end{cases}$$

To personalize the first beamformer coefficients/filters to match the MIE polar pattern, the first beamformer coefficients/filters of the first beamformer can be adapted by playing a sound with a sound source at a first angle, e.g. −30 degrees or −60 degrees for a left hearing device or at e.g. 30 degrees or 60 degrees for a right hearing device. Thereby, the power of the beamforming will be close to the power of the MIE microphone input signal (or a filtered version of this which equalizes the zero-degree response between the first MIE microphone and the front BTE microphone), while keeping the zero-degree response unchanged. This process can be done in the fitting room or Do-It-Yourself with instruction and an App, e.g. on a mobile phone. The first MIE microphone input signal is only used to design and calibrate the first beamformer and will not be used for any further processing in the mode. It is noted that receiver(s) are muted during first beamformer design to avoid feedback mixed with the direct sound.

In one or more examples, first beamformer coefficients of the first beamformer are adapted to maintain an intra-time-difference of the first MIE microphone input signal and a contralateral first MIE microphone input signal of a contralateral hearing device.

For example, The FIR filters a, b, c, d can be adapted to maintain the ITD and ILD of the MIE microphone input signals as follows:

$$(a, b, c, d) = \arg \min_{(a,b,c,d)} \left( \left| \frac{P^l(f, \theta)}{P^r(f, \theta)} - \frac{f_l}{f_r} \right|^2 \right),$$

where $f_l$ and $f_r$ are are spectra of the captured MIE microphone input signals.

In other words, determining first beamformer coefficients of a first beamformer based on a cost function of the method may comprise to maintain an intra-time-difference of the first MIE microphone input signal and a contralateral first MIE microphone input signal of a contralateral hearing device.

In one or more examples, first beamformer coefficients of the first beamformer are adapted to maintain an intra-level-difference of the first MIE microphone input signal and a contralateral first MIE microphone input signal of a contralateral hearing device. In other words, determining first beamformer coefficients of a first beamformer based on a cost function of the method may comprise to maintain an intra-level-difference of the first MIE microphone input signal and a contralateral first MIE microphone input signal of a contralateral hearing device.

In one or more examples, to provide an electrical output signal based on the directional input signal comprises to provide an electrical output signal based on the directional input signal and one or more high-frequency components of the first MIE microphone input signal.

In one or more examples, a method of designing a beamformer of a hearing device is disclosed, the method comprising obtaining a first BTE microphone input signal; obtaining a second BTE microphone input signal; determining first beamformer coefficients of a first beamformer based on a cost function; and applying, e.g. with a first beamformer, the first beamformer coefficients to the first beamformer of the hearing device, wherein determining first beamformer coefficients of a first beamformer based on a cost function comprises determining first beamformer coefficients of a first beamformer based on a cost function comprising a first cost component associated with a first angular range.

In one or more examples, determining first beamformer coefficients of a first beamformer based on a cost function comprises determining first beamformer coefficients of a first beamformer based on a cost function comprising one or both of an omnidirectional component, e.g. associated with an omnidirectional angular range and/or an omnidirectional frequency range, and a second cost component, e.g. associated with a second angular range and/or a second frequency range.

In one or more examples, the method comprising obtaining a first MIE microphone input signal, wherein determining first beamformer coefficients of a first beamformer based on a cost function comprises determining the first beamformer coefficients based on the first MIE microphone input signal.

Determining first beamformer coefficients based on a cost function optionally comprises solving an optimization problem based on the cost function, e.g. minimizing the cost function.

FIG. 1 shows an example hearing device 2, such as a first (left) hearing device 2A and/or a second (right) hearing device 2B, according to this disclosure. The hearing device 2 comprises a set of microphones including a first BTE microphone 10 for provision of a first BTE microphone input signal 10A, a second BTE microphone 12 for provision of a second BTE microphone input signal 12A, and optionally a first MIE microphone 14 for provision of a first MIE microphone input signal 14A. The hearing device 2 comprises a first beamformer 32 connected to the first BTE microphone 10 and the second BTE microphone 12 for provision of a directional input signal 32A based on the first BTE microphone input signal 10A and the second BTE microphone input signal 12A. The first beamformer 32 comprises a first filter 34 and second filter 36 for filtering respective microphone input signals 10A and 12A. For a left hearing device 2A, the first filter 34 has filter coefficients b and the second filter 36 has filter coefficients a as discussed earlier. For a right hearing device 2B, the first filter 34 has filter coefficients d and the second filter 36 has filter coefficients c as discussed earlier. The filter outputs 34A, 36A from respective filters 34, 36 are summed in adder 38 for provision of the directional input signal 32A.

The hearing device 2 comprises a processor 16 for processing the directional input signal 32A for provision of an electrical output signal 16A. The hearing device 2 comprises a receiver 18 for converting the electrical output signal 16A to an audio output signal.

The hearing device 2 optionally comprises a transceiver module 20 for communication with a contralateral hearing device, e.g. hearing device 2B. The transceiver module 22 is configured to receive contralateral data 28 from the contralateral hearing device, the contralateral data 28 comprising a contralateral directional input signal 28A.

The transceiver module 20 comprises a radio transceiver 22 and an antenna 24. The wireless communication unit 20 is configured for wireless communication as indicated by arrow 26, e.g. with a contralateral hearing device of a binaural hearing system. The transceiver module 22 and/or the wireless communication 20 is configured to receive contralateral data 28 from the contralateral hearing device, the contralateral data 28 comprising a contralateral directional input signal 28A.

The first beamformer 32 is a foveated beamformer wherein the first beamformer 32 is configured to process the first BTE microphone input signal 10A and the second BTE microphone input signal 12A with a first level of accuracy in a first angular range, such as from −30 degrees to 30 degrees, and a second level of accuracy in a second angular range, such as angular range not overlapping with or outside the first angular range, and wherein the first level of accuracy is higher than the second level of accuracy.

Figure 2:
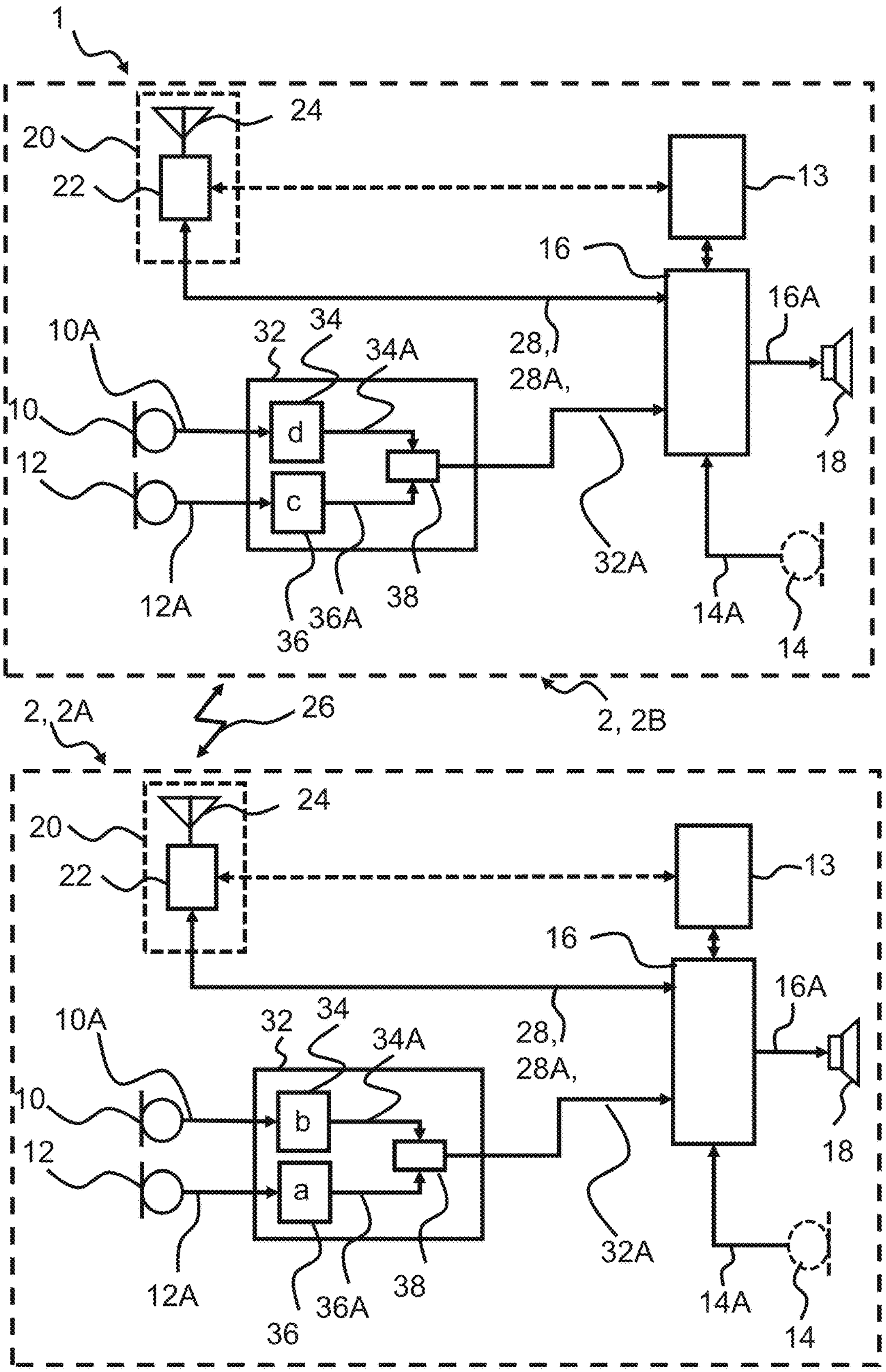

FIG. 2 shows an example binaural hearing system 1 comprising a first hearing device 2A configured as a left hearing device and a second hearing device 2B configured as a right hearing device. The first beamformer 32 comprises a first filter 34 and second filter 36 for filtering respective microphone input signals 10A and 12A. In the first hearing device, 2A, the first filter 34 has FIR filter coefficients b, and the second filter 36 has filter coefficients a forming a foveated beamformer. In the second hearing device, 2A, the first filter 34 has FIR filter coefficients d, and the second filter 36 has filter coefficients c forming a foveated beamformer.

Figure 3:
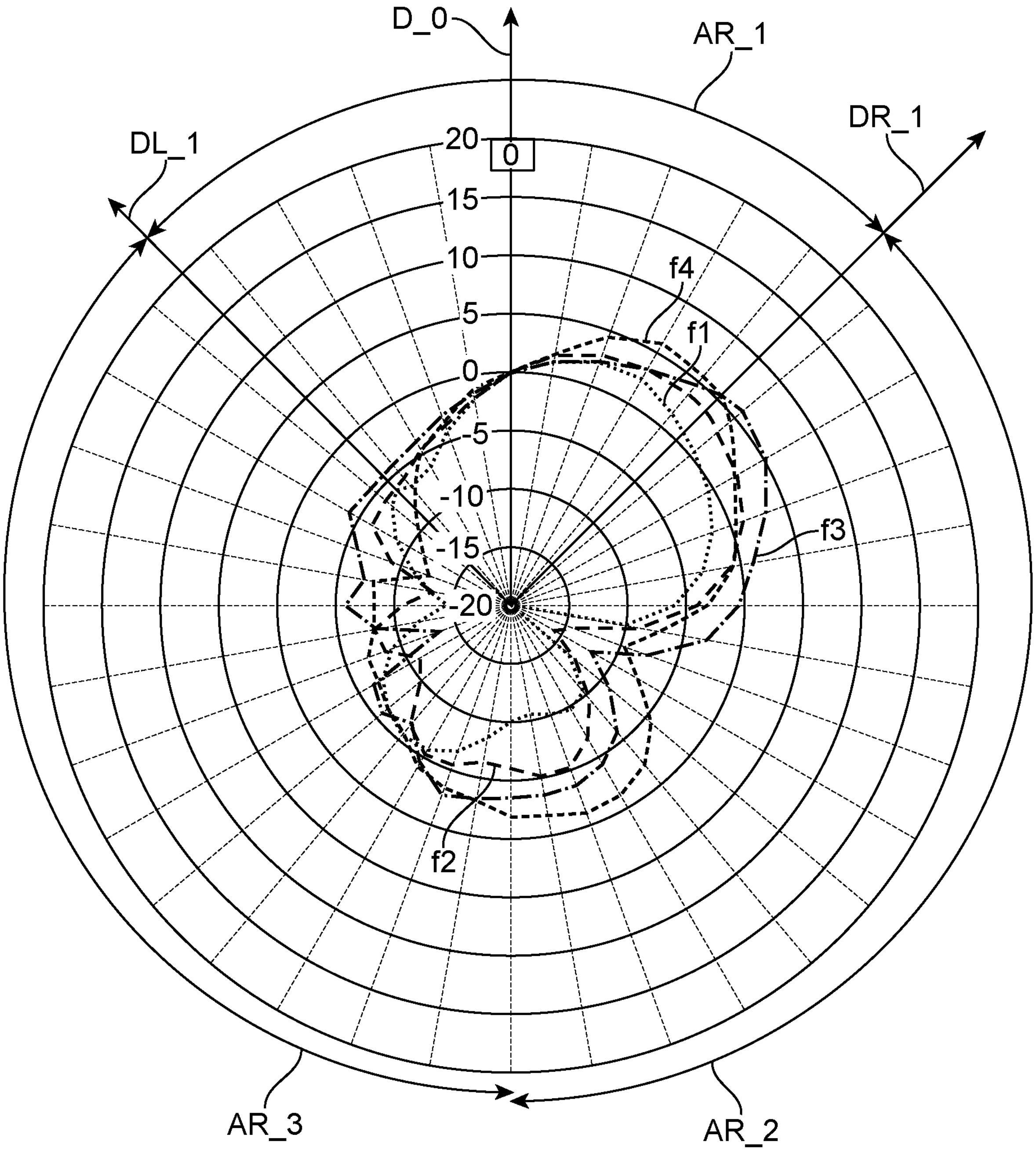
FIG. 3 is an example of a polar pattern of a foveated beamformer according to the present disclosure.
Figure 4:
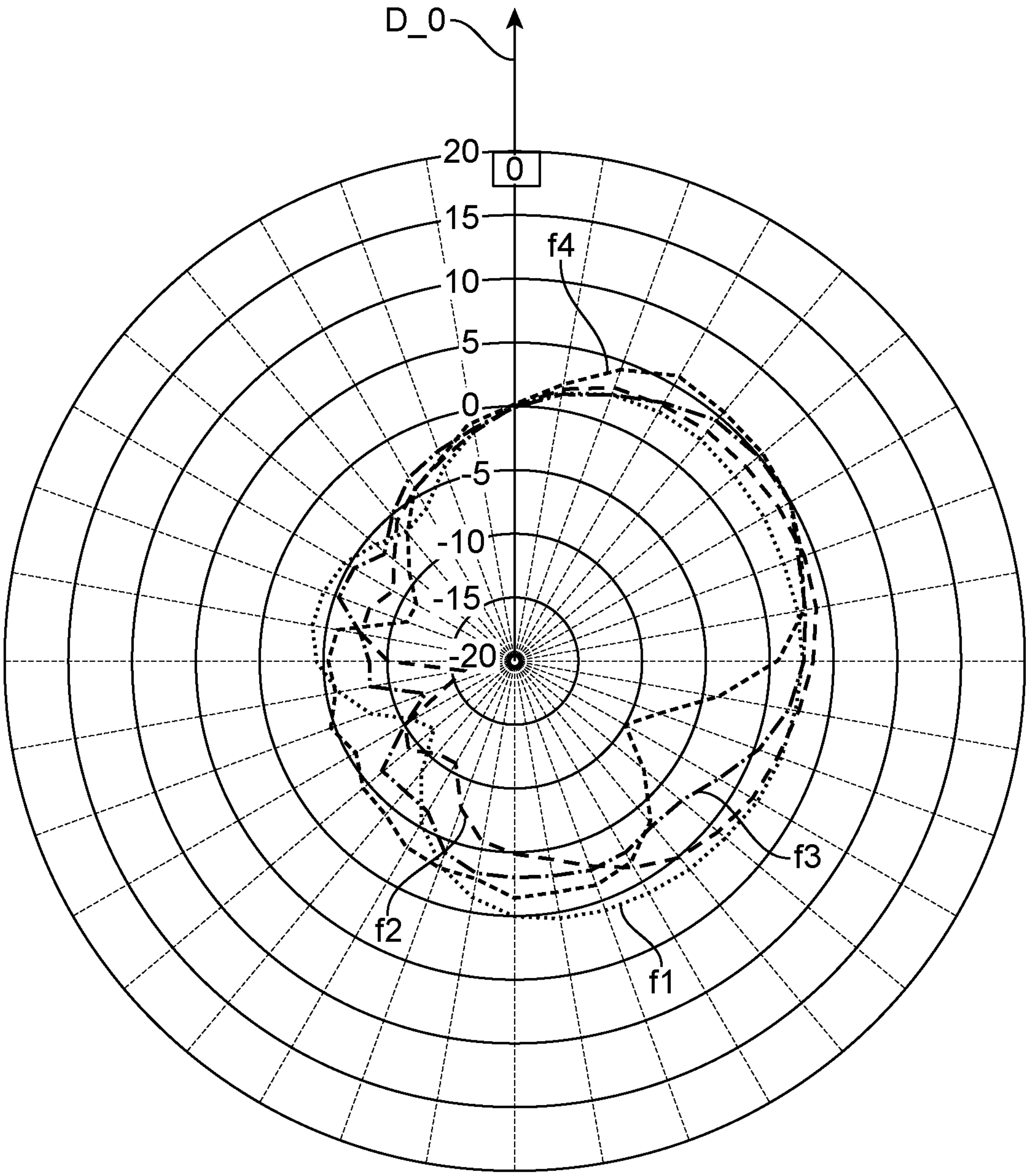
FIG. 4 is an example of a polar pattern of a first MIE microphone.
Figure 5:
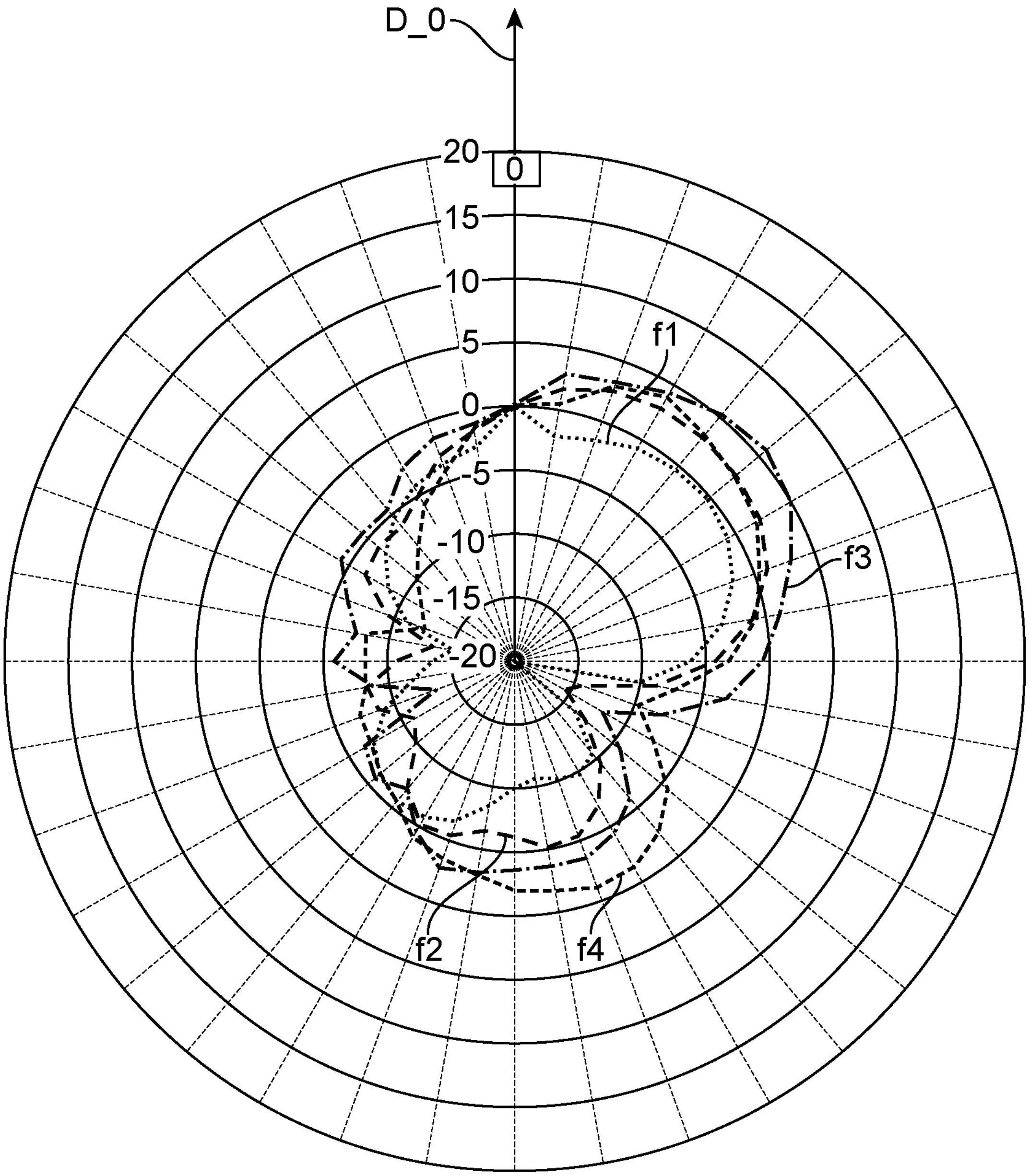
FIG. 5 is an example of a polar pattern of a BTE fixed beamformer.

FIGS. 3-5 show example polar patterns for four frequencies f1=1030 Hz, f2=2050 Hz, f3=3070 Hz, and f4=5160 Hz.

FIG. 3 is an example of a polar pattern of a foveated beamformer according to the present disclosure. The hearing device is configured as a right hearing device, and the first angular range AR_1 is from −45 degrees (first left angle formed between the zero direction D_0 and the first left direction DL_1) to 45 degrees (first right angle formed between the zero direction D_0 and the first right direction DR_1). The foveated beamformer is designed to maintain the spatial cues in the first angular range by including a first cost component based on a polar pattern of the first MIE microphone in the cost function. The foveated beamformer is designed to suppress noise in the second angular range AR_2 from 45 degrees to 180 degrees and in the third angular range AR_3 from −180 degrees to −45 degrees by including second and third cost components based on right beamforming target function in the cost function.

FIG. 4 shows a polar pattern of the first MIE microphone used for determining the foveated beamformer of FIG. 3.

FIG. 5 is an example of a polar pattern of a BTE fixed beamformer.

Also disclosed are hearing devices and methods according to any of the following items:

Item 1. A hearing device for a binaural hearing system, the hearing device comprising:

- a set of microphones comprising a first BTE microphone for provision of a first BTE microphone input signal, and a second BTE microphone for provision of a second BTE microphone input signal;
- a first beamformer connected to the first BTE microphone and the second BTE microphone for provision of a directional input signal based on the first BTE microphone input signal and the second BTE microphone input signal;
- a processor configured to provide an electrical output signal based on the directional input signal; and
- a receiver for converting the electrical output signal to an audio output signal, wherein the first beamformer is a foveated beamformer.

Item 2. Hearing device according to Item 1, wherein the first beamformer is configured to process the first BTE microphone input signal and the second BTE microphone input signal with a first level of accuracy in a first angular range and a second level of accuracy in a second angular range.

Item 3. Hearing device according to Item 2, wherein the first level of accuracy is higher than the second level of accuracy.

Item 4. Hearing device according to any one of Items 2-3, wherein the first angular range includes a left focus range or a right focus range.

Item 5. Hearing device according to any one of Items 2-4, wherein the second angular range includes a left peripheral range or a right peripheral range.

Item 6. Hearing device according to any one of Items 1-5, wherein first beamformer coefficients of the first beamformer are based on a cost function comprising a first cost component associated with the first angular range.

Item 7. Hearing device according to Item 6, the cost function comprising a second cost component associated with the second angular range, wherein the first beamformer coefficients are based on the second cost component.

Item 8. Hearing device according to any one of Items 6-7, the cost function comprising a third cost component associated with a third angular range, wherein the first beamformer coefficients are based on the third cost component.

Item 9. Hearing device according to any one of Items 6-7, the hearing device comprising a first MIE microphone for provision of a first MIE microphone input signal, wherein the cost function COST is given by $$\mathrm{COST} = \mathrm{CC\_L\_1} + \mathrm{CC\_L\_2} + \mathrm{CC\_L\_3}$$

$$R_a\left(\int_{fl1}^{fh1}\int_{-\vartheta}^{+\vartheta}\left(MIE^l(f,\theta) - \left|P^l(f,\theta)\right|\right)^2 df d\theta + \right.$$

$$\int_{fl2}^{fh2}\int_{-180}^{-\vartheta}\left(BF^l(f,\theta) - \left|P^l(f,\theta)\right|\right)^2 df d\theta +$$

-continued $$\int_{fl3}^{fh3}\int_{\vartheta}^{180}\left(BF^l(f,\theta) - \left|P^l(f,\theta)\right|\right)^2 df d\theta,$$

where $P^l$ is beamforming pattern of the first beamformer, $BF^l$ is beamforming target function, MIE is polar pattern of the first MIE microphone, $[-\vartheta,\vartheta]$ are angle limits of first angular range, fh1, fh2, fh3, fl1, fl2, and fl3 are frequency limits of respective frequency ranges, and $R_a$ is a regularizing parameter.

Item 10. Hearing device according to Item 9, wherein first beamformer coefficients of the first beamformer are matched to a polar pattern of the first MIE microphone.

Item 11. Hearing device according to any one of Items 1-10, wherein first beamformer coefficients of the first beamformer are adapted to maintain an intra-time-difference of the first MIE microphone input signal and a contralateral first MIE microphone input signal of a contralateral hearing device and/or an intra-level-difference of the first MIE microphone input signal and a contralateral first MIE microphone input signal of a contralateral hearing device.

Item 12. Hearing device according to any one of Items 1-10, wherein to provide an electrical output signal based on the directional input signal comprises to provide an electrical output signal based on the directional input signal and one or more high-frequency components of the first MIE microphone input signal.

Item 13. Method of designing a beamformer of a hearing device, the method comprising:

- obtaining a first BTE microphone input signal;
- obtaining a second BTE microphone input signal;
- determining first beamformer coefficients of a first beamformer based on a cost function; and
- applying the first beamformer coefficients to the first beamformer of the hearing device, wherein determining first beamformer coefficients of a first beamformer based on a cost function comprises determining first beamformer coefficients of a first beamformer based on a cost function comprising a first cost component associated with a first angular range.

Item 14. Method according to Item 13, the method comprising obtaining a first MIE microphone input signal, wherein determining first beamformer coefficients of a first beamformer based on a cost function comprises determining the first beamformer coefficients based on the first MIE microphone input signal.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that the figures comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

1 binaural hearing system
2 hearing device
2A first hearing device, left hearing device
2B second hearing device, right hearing device
10 first BTE microphone
10A first BTE microphone input signal
12 second BTE microphone
12A second BTE microphone input signal
14 first MIE microphone
14A first MIE microphone input signal
13 memory
16 processor/processing unit
16A electrical output signal
18 receiver
20 transceiver module
22 radio transceiver
24 antenna
26 wireless communication
28 transceiver input signals
28A contralateral microphone input signal
32 first beamformer
32A directional input signal
34 first filter
34A first filter output
36 second filter
36A second filter output
38 adder
D_0 zero direction
DL_1 first left direction
DR_1 first right direction
f_1 first frequency
f_2 second frequency
f_3 third frequency
f_4 fourth frequency
f_5 fifth frequency
VL_1 first left angle
VL_2 second left angle
VR_1 first right angle
VR_2 second right angle

The invention claimed is:

1. A hearing device for a binaural hearing system, the hearing device comprising:
- a set of microphones comprising a first behind-the-ear (BTE) microphone for provision of a first BTE microphone input signal, and a second BTE microphone for provision of a second BTE microphone input signal;
- a first beamformer configured to provide a directional input signal based on the first BTE microphone input signal and the second BTE microphone input signal;
- a processing unit configured to provide an electrical output signal based on the directional input signal; and
- a receiver configured to provide an audio output signal based on the electrical output signal;
- wherein the first beamformer is configured to maintain spatial cues in a first angular range and to suppress noise in a second angular range, wherein the first angular range is anywhere between-60 degrees and 60 degrees, with 0 degree being a look or front direction.

2. The hearing device according to claim 1, wherein the first beamformer is configured to process the first BTE microphone input signal and the second BTE microphone input signal with a first accuracy for the first angular range, and to process the first BTE microphone input signal and the second BTE microphone input signal with a second accuracy for the second angular range.

3. The hearing device according to claim 2, wherein the first accuracy is higher than the second accuracy.

4. The hearing device according to claim 2, wherein the first angular range includes a left focus range or a right focus range.

5. The hearing device according to claim 2, wherein the second angular range includes a left peripheral range or a right peripheral range.

6. The hearing device according to claim 2, wherein first beamformer coefficients of the first beamformer are based on a cost function comprising a first cost component associated with the first angular range.

7. The hearing device according to claim 6, the cost function comprising a second cost component associated with the second angular range, wherein the first beamformer coefficients are based on the second cost component.

8. The hearing device according to claim 7, the cost function comprising a third cost component associated with a third angular range, wherein the first beamformer coefficients are based on the third cost component.

9. The hearing device according to claim 6, further comprising a first MIE microphone for provision of a first microphone-in-ear (MIE) microphone input signal, wherein the cost function is given by COST=

$$R_a\left(\int_{fl1}^{fh1}\int_{-\vartheta}^{+\vartheta}\left(MIE^l(f,\theta)-\left|P^l(f,\theta)\right|\right)^2 df d\theta + \int_{fl2}^{fh2}\int_{-18}^{+\vartheta}\left(BF^l(f,\theta)-\left|P^l(f,\theta)\right|\right)^2 df d\theta + \int_{fl3}^{fh3}\int_{\vartheta}^{180}\left(BF^l(f,\theta)-\left|P^l(f,\theta)\right|\right)^2 df d\theta\right.$$

where COST is the cost function, $P^l$ is beamforming pattern of the first beamformer, $BF^l$ is a beamforming target function, $MIE^l$ is a polar pattern of the first MIE microphone, $[-\vartheta,\vartheta]$ are angle limits of the first angular range, fh1, fh2, fh3, fl1, fl2, and fl3 are frequency limits of respective frequency ranges, and $R_a$ is a regularizing parameter.

10. The hearing device according to claim 1, further comprising a first microphone-in-ear (MIE) microphone, wherein first beamformer coefficients of the first beamformer correspond to a polar pattern of the first MIE microphone.

11. The hearing device according to claim 1, further comprising a first microphone-in-ear (MIE) microphone configured to provide a first MIE microphone input signal, wherein the processing unit is configured to provide the electrical output signal based on the directional input signal and one or more high-frequency components of the first MIE microphone input signal.

12. The hearing device according to claim 1, wherein the first beamformer is a foveated beamformer.

13. The hearing device according to claim 1, wherein the first angular range corresponds to human binocular field of view.

14. A hearing device for a binaural hearing system, the hearing device comprising:

a set of microphones comprising a first behind-the-ear (BTE) microphone for provision of a first BTE microphone input signal, and a second BTE microphone for provision of a second BTE microphone input signal;

a first beamformer configured to provide a directional input signal based on the first BTE microphone input signal and the second BTE microphone input signal;

a processing unit configured to provide an electrical output signal based on the directional input signal;

a receiver configured to provide an audio output signal based on the electrical output signal; and a first microphone-in-ear (MIE) microphone configured to provide a first MIE microphone input signal, wherein first beamformer coefficients of the first beamformer are adapted to maintain a difference of the first MIE microphone input signal and a contralateral first MIE microphone input signal of a contralateral hearing device, wherein the difference is an intra-time-difference or an intra-level-difference.

15. The method of configuring a hearing device, the method comprising:

obtaining a first behind-the-ear (BTE) microphone input signal;

obtaining a second BTE microphone input signal;

determining first beamformer coefficients of a first beamformer based on a cost function, the cost function comprising a first cost component associated with a first angular range; and applying the first beamformer coefficients to the first beamformer of the hearing device;

wherein the first beamformer is configured to maintain spatial cues in a first angular range and to suppress noise in a second angular range, wherein the first angular range is anywhere between-60 degrees and 60 degrees, with 0 degree being a look or front direction.

16. The method according to claim 15, further comprising obtaining a first microphone-in-ear (MIE) microphone input signal, wherein the first beamformer coefficients of the first beamformer are determined based on the first MIE microphone input signal.

17. The method according to claim 15, wherein the first beamformer is a foveated beamformer.

18. The method according to claim 15, wherein the first angular range corresponds to human binocular field of view.

19. The method according to claim 15, wherein the first angular range is anywhere between −45 degrees and 45 degrees.

20. The hearing device according to claim 15, wherein the first angular range is anywhere between-45 degrees and 45 degrees.

* * * * *